United States Patent
Hurley

(10) Patent No.: US 6,928,991 B2
(45) Date of Patent: Aug. 16, 2005

(54) EVAPORATIVE EMISSION SYSTEM INTEGRITY MODULE

(75) Inventor: Darrin W Hurley, Brownstown, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/706,134

(22) Filed: Nov. 12, 2003

(65) Prior Publication Data

US 2005/0056088 A1 Mar. 17, 2005

Related U.S. Application Data

(60) Provisional application No. 60/503,394, filed on Sep. 16, 2003.

(51) Int. Cl.[7] .............................................. F02M 33/02
(52) U.S. Cl. ...................................... 123/519; 123/516
(58) Field of Search ................................ 123/520, 519, 123/518; 73/117.3, 118.1

(56) References Cited

U.S. PATENT DOCUMENTS

| | | | | |
|---|---|---|---|---|
| 4,308,841 A | * | 1/1982 | Kingsley ..................... | 123/520 |
| 5,383,437 A | * | 1/1995 | Cook et al. .................. | 123/520 |
| 5,474,050 A | * | 12/1995 | Cook et al. .................. | 123/520 |
| 6,073,487 A |   | 6/2000 | Dawson ...................... | 73/118.1 |
| 6,328,021 B1 | * | 12/2001 | Perry et al. ................. | 123/518 |
| 6,823,850 B1 | * | 11/2004 | Hurley ........................ | 123/518 |

* cited by examiner

Primary Examiner—Mahmoud Game
(74) Attorney, Agent, or Firm—Thomas A. Jurecko

(57) ABSTRACT

An evaporative emission control and leak detection system for a motor vehicle is provided. The system is in fluid communication with a fuel tank, an engine, and a carbon canister and includes an integrated valve module that is in fluid communication with the carbon canister and the atmosphere. The module provides for venting of the system when the system is exposed to predetermined high negative and positive pressure conditions, and a predetermined low negative pressure condition. The module also includes a switch that is operable to indicate when the system is in a high or low negative pressure condition for leak detection verification of the system.

9 Claims, 4 Drawing Sheets

EVAPORATIVE EMISSION SYSTEM INTEGRITY MODULE

CROSS REFERENCE TO RELATED APPLICATION(S)

This application claims the benefit of U.S. Provisional Application No. 60/503,394 filed Sep. 16, 2003.

FIELD OF THE INVENTION

The present invention relates generally to evaporative emission control for a motor vehicle, and, more particularly, to an improved leak detection and control arrangement for an evaporative emission system of a motor vehicle.

BACKGROUND OF THE INVENTION

In a conventional evaporative emission system, an emission control device is utilized to recover fuel vapor in a charcoal canister from a refueling event and selectively purge this fuel vapor from the charcoal canister into the engine. The emission control device is further utilized to perform leak detection tests to verify the integrity of the evaporative emission system and also provide pressure relief of the evaporative emission system. The emission control device is typically connected to an engine and a fuel tank and also includes a connection to the atmosphere. In general, conventional emission control devices provide control of various valves under specific engine operating conditions to perform system leak tests as well as system pressure relief. An example of such an evaporative emission system is disclosed in commonly owned U.S. Pat. No. 6,073,487 which is hereby incorporated by reference.

While such conventional systems work for their intended purpose, packaging of numerous system components and solenoids undesirably increase complexity and cost as well as typically require calibration for effective operation. Thus, there is a need for an evaporative emission system that overcomes the aforementioned and other disadvantages.

SUMMARY OF THE INVENTION

Accordingly, an evaporative emission control and leak detection system for a motor vehicle is provided. The system is in fluid communication with a fuel tank, an engine, and a carbon canister. The system includes an integrated valve module that is in fluid communication with the carbon canister and the atmosphere. The module is arranged to vent the system when exposed to predetermined high negative and positive pressure conditions, and a predetermined low negative pressure condition. The module includes a switch mechanism that is operable to indicate when the system is in a high or low negative pressure condition.

In accordance with another aspect of the present invention, the system can further include low and high negative pressure valves and a high positive pressure valve. The low and high negative pressure valves are coupled in parallel to a fluid passage between the carbon canister and the atmosphere and the high positive pressure valve is coupled to a flow passage between the carbon canister and the atmosphere that bypasses the low negative pressure and high negative pressure valves.

BRIEF DESCRIPTION OF THE DRAWINGS

Other aspects, features, and advantages of the present invention will become more fully apparent from the following detailed description of the preferred embodiment, the appended claims, and in the accompanying drawings in which:

DETAILED DESCRIPTION OF THE PREFERRED EMBODIMENT

Figure 1:
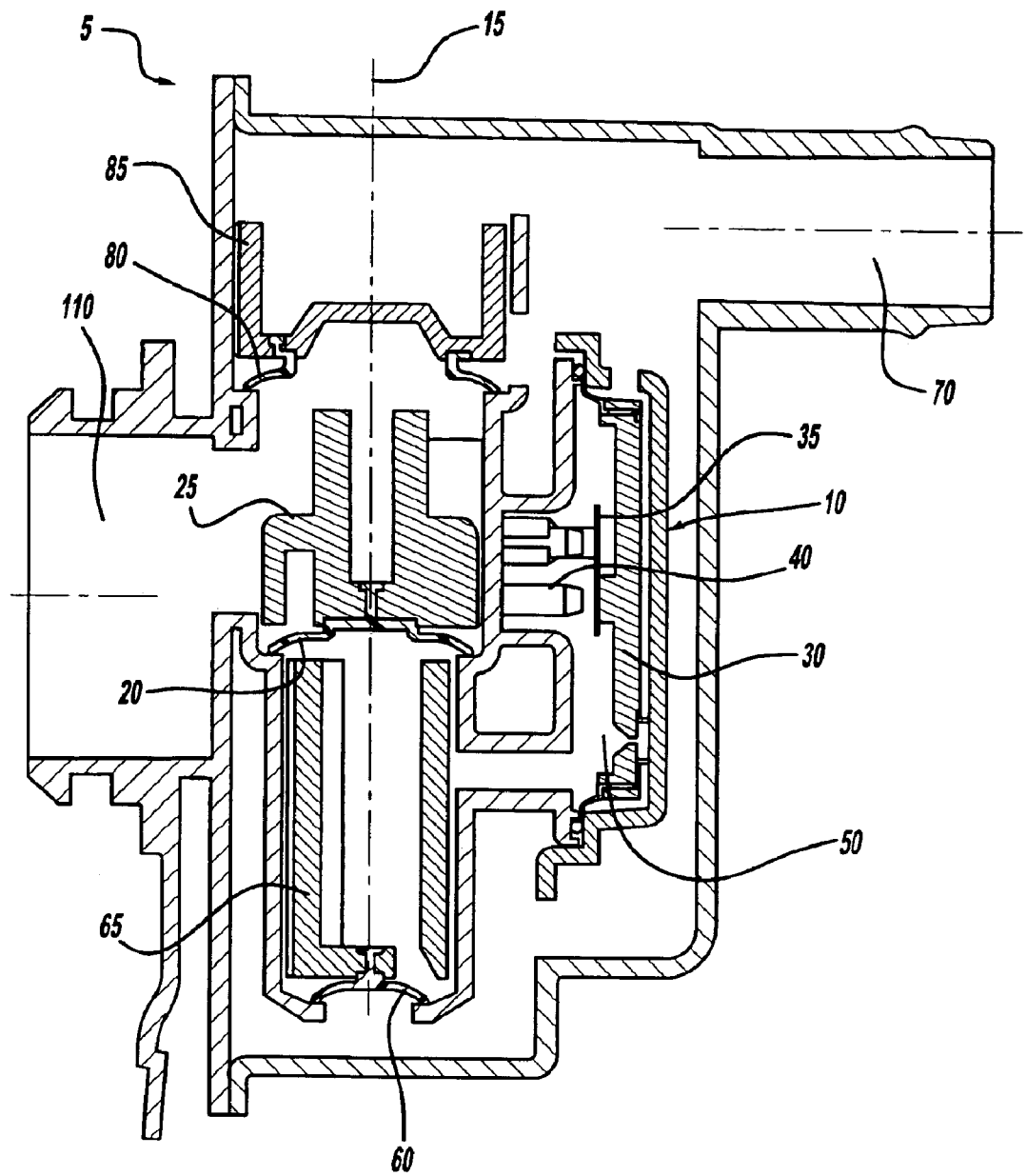
FIG. 1 illustrates a cross sectional view of an exemplary embodiment of an integrity module in accordance with the present invention.

Referring now to the drawings, FIG. 1 illustrates a cross section of an exemplary embodiment of emission control module 5 with valve components packaged in a vertical arrangement along a common axis 15. This vertical configuration provides for, among other things, easy assembly of the valve components in a manufacturing process.

In accordance with one aspect of the present invention and referring to FIG. 1, a switch mechanism 10 is provided for performing low level vacuum leak detection testing when the vehicle is not in operation. The switch mechanism 10 comprises a low negative pressure one-way valve 20 and a biased-open low vacuum switching element 30, such as a spring-biased diaphragm illustrated in FIG. 1, arranged to engage an electrical connector 40. Low negative pressure valve 20 further includes a gravity biasing member arranged to bias valve 20 to a closed position.

Figure 2:
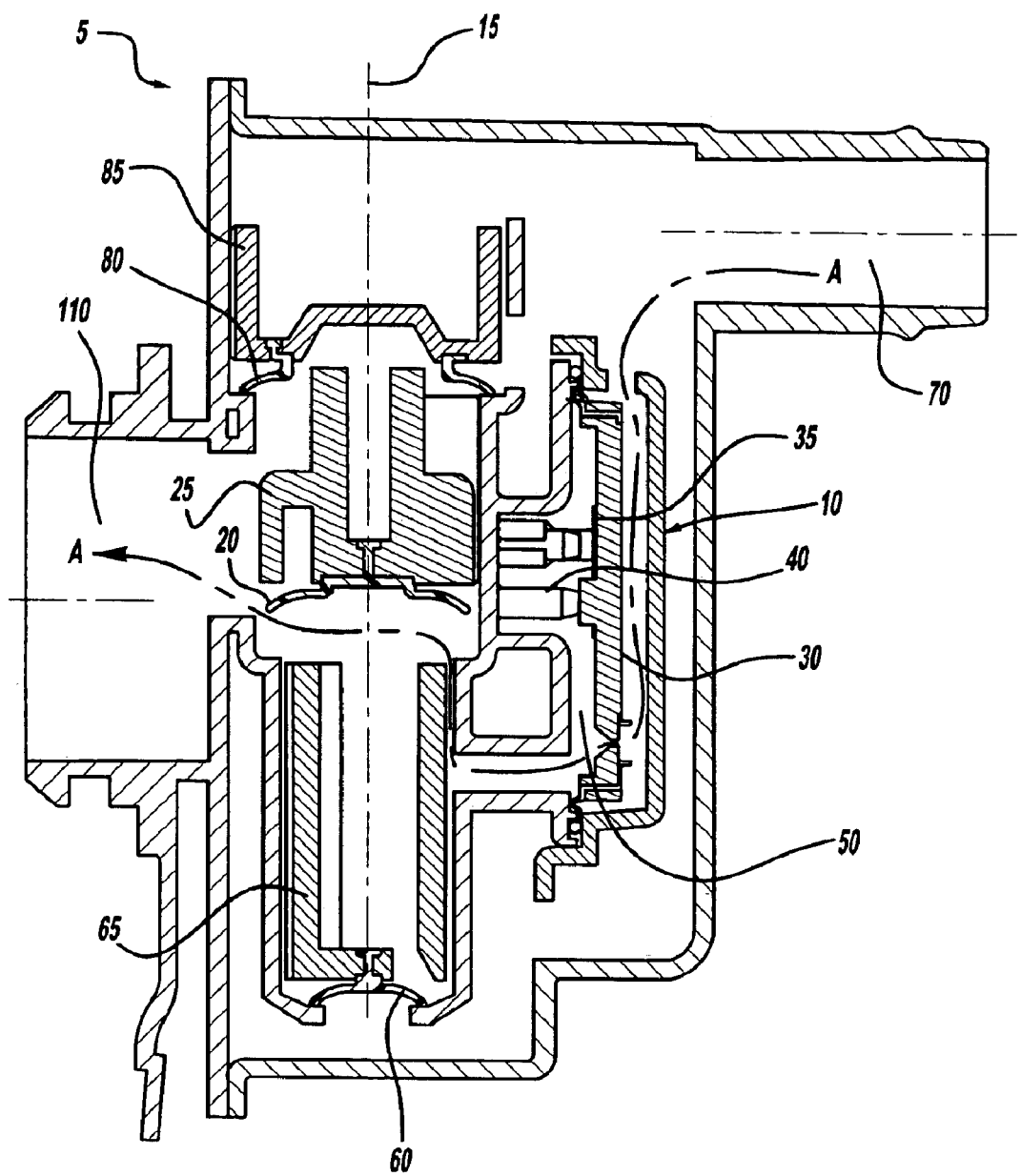
FIG. 2 illustrates a cross sectional view of an exemplary embodiment under a low vacuum relief condition in accordance with the present invention.

In operation and referring to FIG. 2, the low pressure one-way valve 20 is arranged to open at a predetermined low vacuum condition threshold, thereby exposing a chamber 50 containing the low vacuum switch element 30 to a low vacuum condition that was generated by vehicle operation. The biasing of the low vacuum switch element via flat spring 35 is arranged to be overcome at a vacuum threshold lower than the threshold of check valve 20 such that upon exposure to the low vacuum condition, the low vacuum switch element 30 will engage the electrical connector 40 and thereby complete a circuit for low level leak test verification. The pattern of fluid flow for low vacuum relief and low vacuum leak test verification is illustrated by arrow A in FIG. 2.

In accordance with another aspect of the present invention, the emission control apparatus further includes a high negative pressure valve 60 positioned relative to an atmospheric port 70 and a carbon canister port 110. It should be appreciated that the carbon canister may be coupled to the integrity module or arranged in fluid communication with the integrity module via carbon canister port 110. High negative pressure valve 60 is arranged in conjunction with the low vacuum switch element 30 and the low negative pressure valve 20 to allow for high vacuum leak detection testing, high vacuum regulation, and canister purging. High negative pressure valve 60 further includes a gravity biasing member 65 arranged to bias valve 60 to a closed position.

Figure 3:
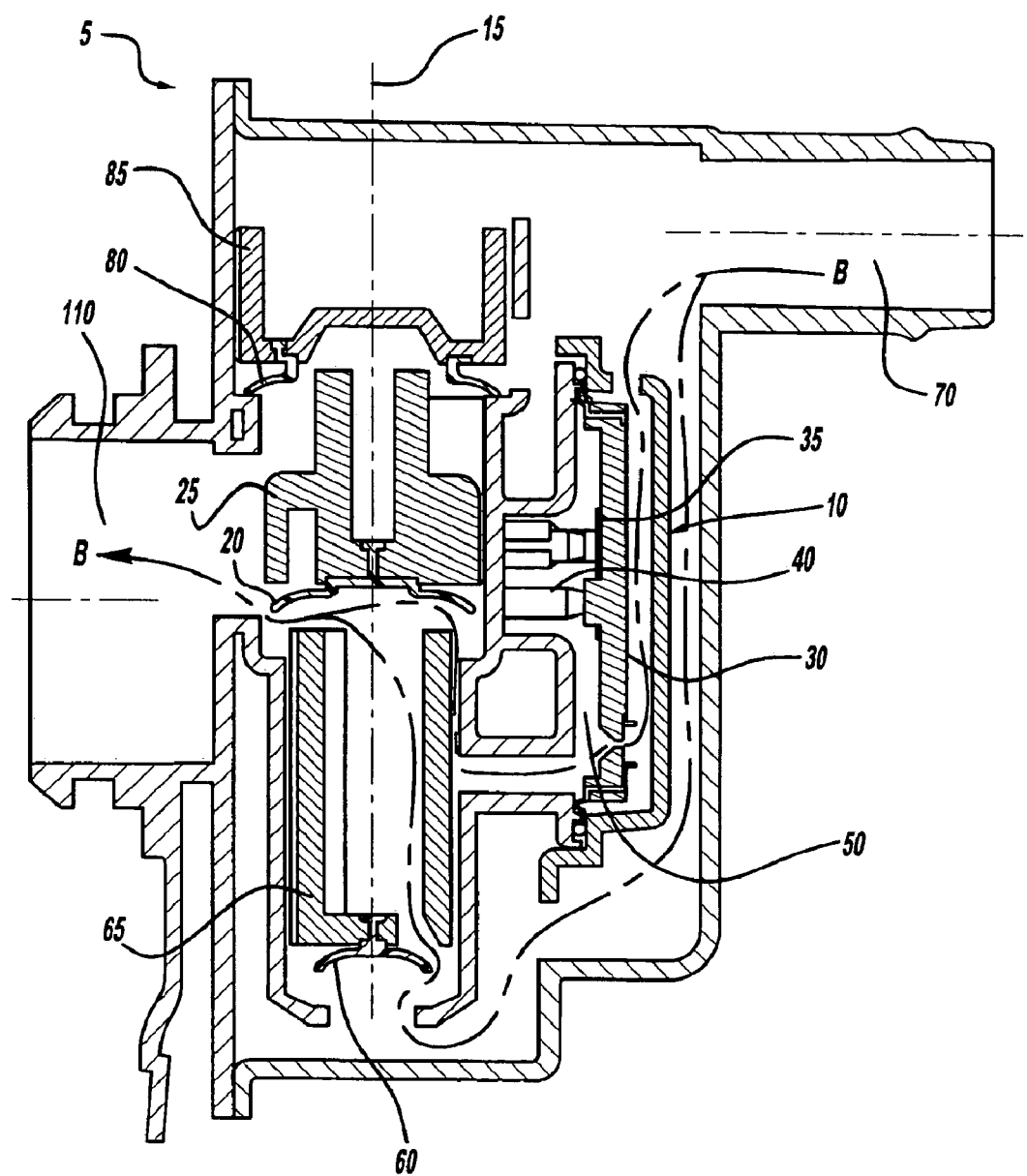
FIG. 3 illustrates a cross sectional view of an exemplary embodiment under a high vacuum relief condition in accordance with the present invention.

In operation and referring to FIG. 3, when a high vacuum leak test is desired to be performed, an engine purge valve (not shown) is operated to close a connection between the emission control apparatus 5 and an engine (not shown) to create a high vacuum condition in the evaporative emission system. Initially, when the high vacuum condition is above a predetermined high vacuum threshold, both high negative pressure valve 60 and valve 20 are in an open position. Subsequently operating the purge valve to stop the vacuum draw thereby allows the high vacuum condition to start to bleed down. Stopping the vacuum draw causes the amount of vacuum to drop below the threshold of the high vacuum threshold of high negative pressure valve 60 and thus allowing for it to close. As the vacuum bleeds down to a level below the low vacuum threshold of low negative pressure valve 20, the valve 20 will likewise close and the low vacuum switch element 30 is arranged to disengage from the electrical connector 40 and open the circuit. The rate at which the vacuum bleeds down from the high vacuum threshold to a level that opens the circuit is measured and compared to a calibrated value for high vacuum leak test verification. Fluid flow distribution for the high vacuum leak test verification and regulation is shown by arrows B in FIG. 3.

Figure 4:
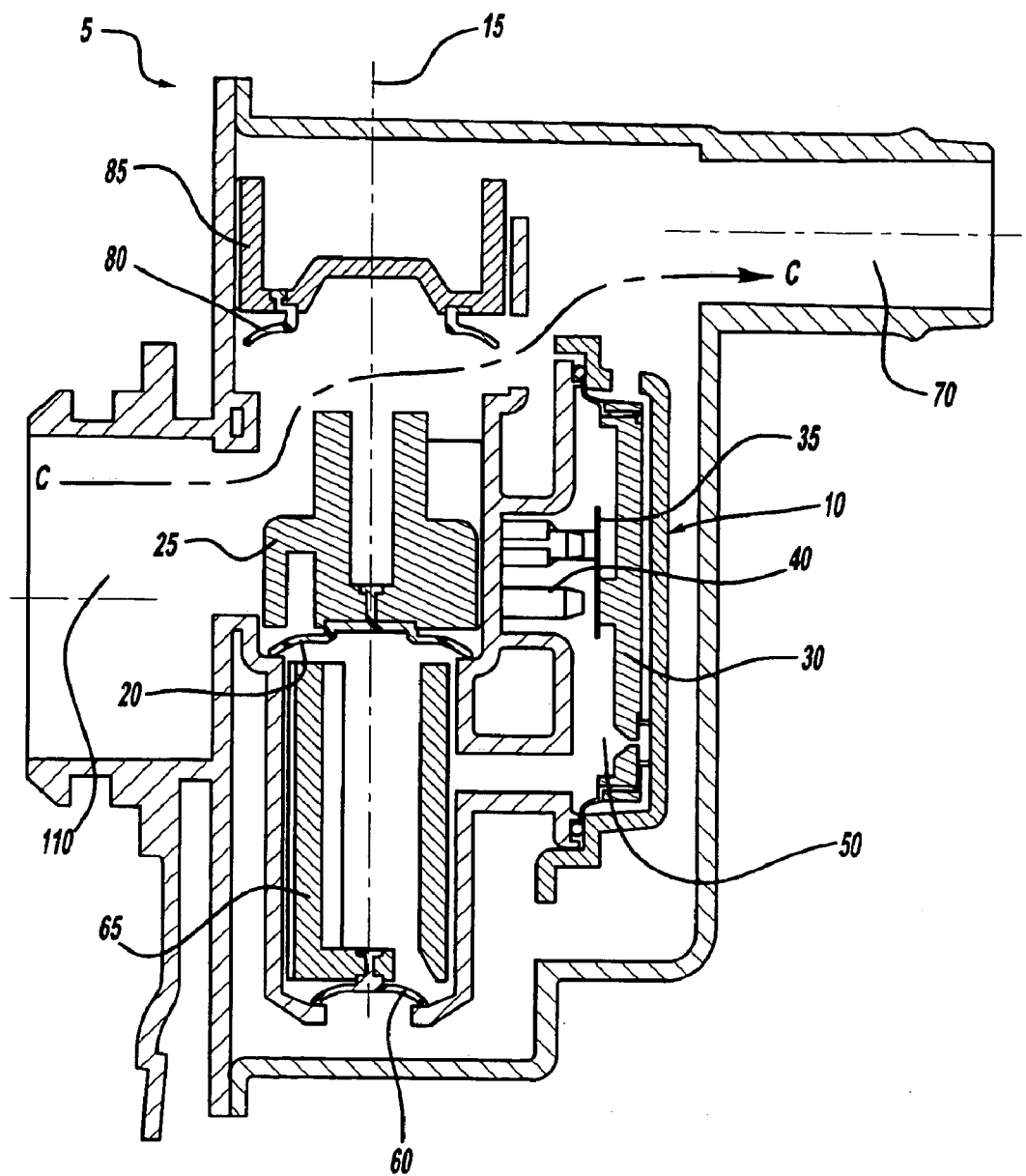
FIG. 4 illustrates a cross sectional view of an exemplary embodiment under a pressure relief and/or refueling bypass condition in accordance with the present invention.

In accordance with another aspect of the present invention and referring to FIG. 4, emission control module 5 further includes a high positive pressure valve 80. High positive pressure valve 80 is operably connected to a carbon canister (not shown) at the canister interface port 110 and the atmosphere at atmospheric port 70 while bypassing the low negative pressure and high negative pressure valves. High positive pressure valve 80 includes a gravity biasing member 85 and is arranged to provide positive pressure relief and regulation and refueling bypass if engine pressure exceeds a predetermined high positive pressure threshold of high positive pressure valve 80. A fluid flow pattern for positive pressure relief is shown by arrows C in FIG. 4.

Incorporation of vacuum relief and regulation capability into the emission control apparatus provides for elimination of a separate, remotely packaged solenoid valve typically used in conventional evaporative emission control systems. In addition, by providing a low vacuum switch element having a check valve in accordance with this invention, the need for calibration on the switch element is obviated. More specifically, when the low vacuum condition is present in the system, the low pressure one-way valve opens allowing the vacuum into a chamber containing the low vacuum switch element and the electrical connector. Before the low vacuum check valve opens, the pressure in this chamber is substantially atmospheric. In the exemplary embodiment, the low vacuum switch element is biased open with a light spring and requires very little pressure to actuate (less than the low level vacuum check valve threshold), thus eliminating a need to calibrate the spring. These components are spatially separated and combined in a module in the emission control apparatus allowing for a more efficient packaging arrangement.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An evaporative emission control and leak detection system for a motor vehicle the system in fluid communication with emissions from a fuel tank, an engine and a carbon canister, the system comprising:

an integrated valve module in fluid communication with the carbon canister and the atmosphere, and arranged to vent the system when exposed to predetermined high negative and positive pressure conditions, and a predetermined low negative pressure condition, the module comprising:
a switch operable to indicate when the system is in a high or low negative pressure condition;
a one-way low negative pressure valve;
a one-way high negative pressure valve, wherein the low and high negative pressure valves are coupled in parallel to a fluid passage between the carbon canister and the atmosphere; and
a one-way high positive pressure valve coupled to a flow passage between the carbon canister and the atmosphere that bypasses the low negative pressure and high negative pressure valves.

2. The system of claim 1, wherein the low negative pressure one-way valve includes a gravity-biased valve member and is arranged to provide low negative pressure system relief and low level system leak test verification, the low negative pressure valve biased to a closed position unless a negative pressure exceeding a predetermined low negative pressure threshold is present in the system.

3. The system of claim 1, wherein the module further comprises a chamber in parallel fluid communication with the low negative and high negative pressure valves and the atmosphere, and wherein the switch is positioned within the chamber.

4. The system of claim 3, wherein the switch comprises a diaphragm member coupled to a biasing member and an electrical connector, the switch arranged to overcome the biasing member and contact the electrical connector upon being exposed to a negative pressure condition sufficient to open the low pressure valve.

5. The system of claim 1, wherein the high negative pressure one-way valve includes a gravity biased valve member and is arranged to provide high negative system pressure relief and regulation, the high negative pressure valve biased to a closed position unless a negative pressure exceeding a predetermined high negative pressure threshold is present in the system.

6. The system of claim 1, wherein the high positive pressure one-way valve includes a gravity-biased valve member and is arranged to provide high positive pressure system relief, the high positive pressure valve biased to a closed position unless a positive pressure exceeding a predetermined high positive pressure threshold is present in the system.

7. The system of claim 1, wherein the high positive pressure one-way valve is further arranged to provide pressure relief for the system during refueling of the fuel tank.

8. The system of claim 1, wherein the low and high negative pressure valves and the high positive pressure valve are positioned in the integrated valve module in a stacked arrangement along a common axis of translation.

9. The system of claim 1, wherein the carbon canister is coupled to the integrity module.

* * * * *